United States Patent [19]

O'Connor

[11] 4,186,953

[45] Feb. 5, 1980

[54] CLOSURE LATCH MECHANISM WITH CLOSING PRESSURE CAM

[75] Inventor: Daniel P. O'Connor, Parsippany, N.J.

[73] Assignee: Ellcon-National, Inc., Totowa, N.J.

[21] Appl. No.: 838,521

[22] Filed: Feb. 4, 1977

Related U.S. Application Data

[63] Continuation of Ser. No. 632,312, Nov. 17, 1975, abandoned.

[51] Int. Cl.² .............................................. E05C 3/04
[52] U.S. Cl. .................................... 292/210; 49/141; 292/52; 292/DIG. 65
[58] Field of Search ............... 292/200, 210, 211, 100, 292/108, DIG. 65, 92, 52, 236; 49/141, 278

[56] References Cited

U.S. PATENT DOCUMENTS

| 222,998 | 12/1879 | Mann | 292/210 |
|---|---|---|---|
| 778,000 | 12/1904 | Bell | 292/210 |
| 2,830,843 | 4/1958 | Seaburg et al. | 49/141 |

FOREIGN PATENT DOCUMENTS

856772  8/1959  United Kingdom ............ 49/141

Primary Examiner—Kenneth J. Dorner
Attorney, Agent, or Firm—Brooks, Haidt, Haffner & Delahunty

[57] ABSTRACT

A latch assembly for a closure, particularly a vehicle emergency exit window, comprising a pivotally mounted latch bar engageable with a cam or a pair of cams for providing the force which holds the closure against the structure surrounding the opening closed by the closure. In the preferred embodiment, both the latch bar and a pair of cams are pivotally mounted on the closure so that the cams are engageable with the structure. In other embodiments, the latch bar is pivotally mounted on the closure or on the structure and the cam or cams are either pivotally mounted or mounted in a fixed position on the structure.

14 Claims, 19 Drawing Figures

CLOSURE LATCH MECHANISM WITH CLOSING PRESSURE CAM

This is a continuation of application Ser. No. 632,312, filed Nov. 17, 1975 abandoned.

This invention relates to a latch which presses a closure into its closed position but which is readily releasable from one side of the closure and relates particularly to a latch for an emergency exit door or window.

Latches of the type to which the invention relates are known in the art, and are used to secure various closures, such as an emergency exit door or window, so that the closure cannot be opened from the outside of a vehicle or building, but can be readily released and opened from the inside of the vehicle or building. When the closure is a window of a vehicle, special requirements are involved.

In the first place, the window opening is relatively small, and it is important that the opening be relatively unobstructed when the window is open in order to make the full opening available for exiting and to prevent injury or an impediment to an exiting vehicle passenger. In addition, the latch should project into the vehicle by as small a distance as is practical, so that passenger seating space is not reduced.

In the second place, the window usually bears against a seal around the opening, such as a strip of rubber, and the latch must exert sufficient force on the window to cause it to have proper engagement with the seal. Of course, such requirement must be met without making it necessary for a person to exert a large amount of force to close or open the window.

In the third place, the latch should be installed easily, and because window construction and installation is not maintained within close tolerances, the latch should permit significant dimension variations without requiring time-consuming installation adjustments.

In the fourth place, particularly when the vehicle is a public transportation vehicle, the latch must meet Federal Motor Vehicle Safety Specifications, e.g., FMVSS No. 217.

Commercially available latches for vehicle emergency closures do not meet all of such requirements. In one type in which keepers are mounted on the structural frame around the window opening and pivotable members mounted on the rim of the window snap over the keepers, the keepers require mounting holes and fasteners and usually, removal of trim. The keepers are of such a size that they project inwardly of the vehicle an amount which presents a hazard to an exiting passenger and interferes with seating space. Such type also requires separate mounting of the pivotable members on the window rim, accurate adjustment thereof or of the keepers to provide the "snap" action and substantial force to close and open the latch.

In another type formed as part of the window and the surrounding structure, several parts, such as handles, cables, catches, springs, etc., are used and modification of the window structure and/or the surrounding frame is required, thereby increasing the cost of the end user.

One object of the invention is to provide a latch for an emergency exit closure, but which may be used for securing other closures, which is easily installed, simple in construction and highly resistant to accidental opening but operable with relatively low forces.

Another object of the invention is to provide a latch which will exert the forces necessary to press the closure against the closure seal, but which does not require close construction tolerances or time-consuming adjustments.

In accordance with the preferred embodiment of the invention, the latch comprises a pair of spaced bracket members which are secured to an outer portion of the closure, e.g., the window rim, a pair of cams pivotally mounted on the bracket members, one on each member, and a latch bar or handle also pivotally mounted at opposite ends on said bracket members, the pivot axis of the bar being different from the pivot axes of the cams. The cams are engageable with the frame or structure around the opening which is closed by the closure, and the cams are pivoted and locked in position by the latch bar which is engageable with the cams.

Other objects and advantages of the present invention will be apparent from the following detailed description of the preferred embodiments thereof, which description should be considered in conjunction with the accompanying drawings in which:

FIG. 7 is a fragmentary, perspective view illustrating a modified embodiment of the latch assembly of the invention;

Although the latch assembly of the invention may be employed in connection with various types of closures, such as doors for buildings, vehicles, refrigerators, pressure vessels, vacuum chambers, autoclaves, etc., the preferred embodiment of the invention will be described in connection with the use thereof for securing a closure for a vehicle emergency exit which comprises a transparent window.

Figures 1, 2, 3:
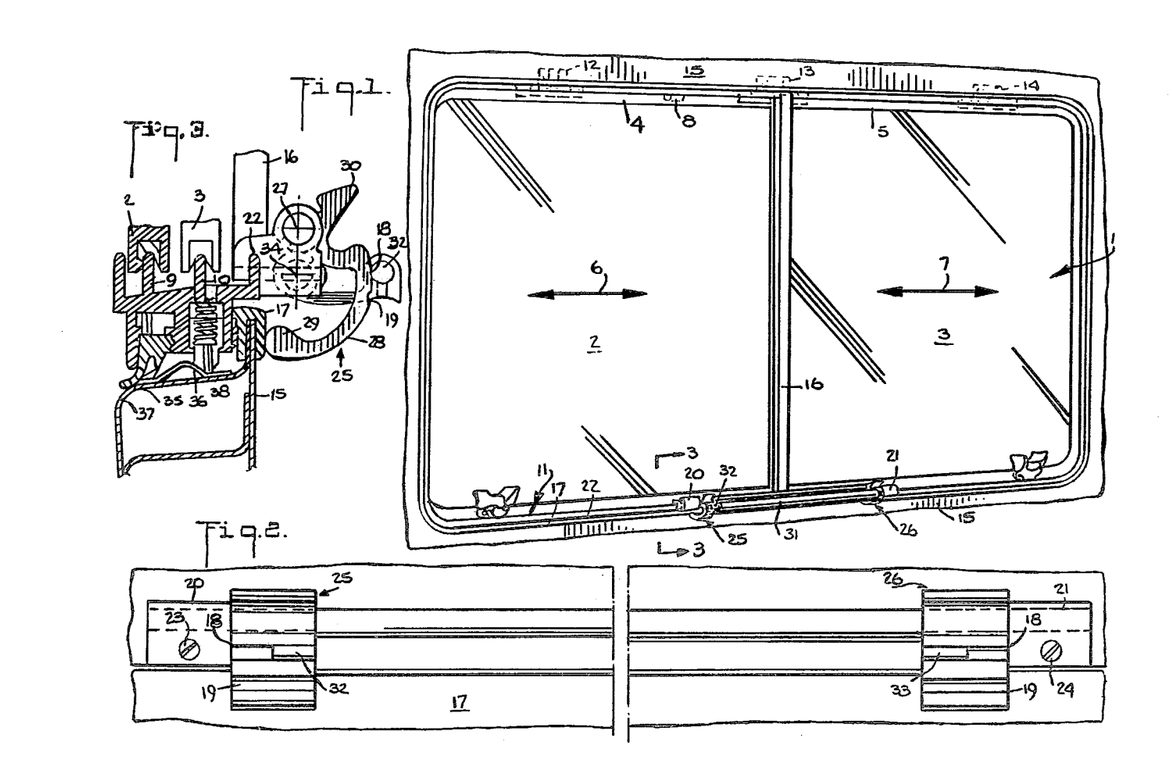
FIG. 1 is a perspective view of the latch assembly of the invention installed on a hinged window forming the closure for an emergency exit.
FIG. 2 is an enlarged, front view of the latch assembly shown in FIG. 1.
FIG. 3 is an enlarged, end view, partly in cross-section, of a portion of the structure shown in FIG. 1 and is taken along the line 3—3 indicated in FIG. 1.

FIG. 1 illustrates a window 1 which comprises a pair of shatter resistant, transparent panes 2 and 3 respectively bounded at their edges by metal rims 4 and 5. Each of the panes 2 and 3, along with its surrounding rim 4 and 5, is slidable in the direction of the double-ended arrows 6 and 7, the movement of the pane 3 to the left as viewed in FIG. 1 being limited by a stop 8 and movement of the pane 2 to the right as viewed in FIG. 1 being limited by a similar stop (not shown). The panes 2 and 3 with their surrounding rims 4 and 5 ride on tracks 9 and 10 (FIG. 3), and are guided at their upper ends by similar tracks or channels. The tracks 9 and 10 extend from a frame 11 which is supported by hinges 12–14 secured to the fixed vehicle structure 15. A vertical bar 16 extends from the lower to the upper portions of the frame 11.

The preferred embodiment of the latch assembly of the invention comprises bracket means in the form of a pair of brackets 20 and 21 secured to an upwardly projecting portion 22 of the window frame 11, such brackets 20 and 21 being secured to the projection 22 in any desired manner, such as by means of screws 23 and 24.

The latch assembly of the invention also comprises cam means in the form of a pair of cams 25 and 26 pivotally mounted on the brackets 20 and 21 so as to pivot around an axis 27 (FIG. 3). The cams 25 and 26 may be identical and each has a face 28 which faces radially outwardly from the axis 27 and is radically spaced from such axis 27. The distance of the face 28 from the axis 27 increases in a direction circumferentially of the axis 27, e.g., in a clockwise direction around the axis 27 as viewed in FIG. 3. Each cam also has a portion 29 engageable with a sealing strip 17 forming part of the vehicle structure 15 at the lower portion of the window opening, and has a radially outwardly extending portion 30 for purposes hereinafter described.

The latch assembly of the invention also comprises a latch bar or handle 31 having a pair of projecting portions 32 and 33 engageable with the faces 28 of each of the cams 25 and 26. The latch bar 31 is pivotally mounted from the brackets 20 and 21 so that it is pivotable around an axis 34 in vertically spaced relation with respect to the axis 27 of the cams 25 and 26. Thus, when the latch bar 31 is urged manually in the downward direction, as viewed in FIG. 3, the projections 32 and 33 on the latch bar 31 press against the faces 28 of the cams 25 and 26 and urge the portions 29 of the cams 25 and 26 against the portion of the vehicle structure 15 below the window opening. At the same time, the brackets 20 and 21 acting on the projection 22 of the window frame 11 pull the window 1 inwardly at the bottom thereof and press the frame 11 against the sealing strip 17. Of course, such action on the latch bar 31 also causes the remainder of the frame 11 to pull up against the sealing strip 17 which extends around the window opening.

It will be observed that the cam faces 28, at the upper ends thereof, are spaced from the axis 34 by a distance less than the distance between the projecting portions 32 and 33 and the axis 34 and that the spacing of the cam faces 28 increases to an amount greater than said distance in a clockwise direction around the axis 34 as viewed in FIG. 3. Thus, the projecting portions 32 and 33 readily engage the faces 28, without the application of any substantial force, and as the latch bar 31 is pressed downwardly, the forces which the portions 29 of the cams 25 and 26 apply to the structure 15, and hence the forces pressing the window frame 11 against the sealing strip 17 and the vehicle structure 15, are increased. Thus, the force holding the window frame 11 against the sealing strip 17 may be adjusted as desired by suitable shaping of the cam faces 28 and by the pressure applied to the latch bar 31. If desired, the faces 28 may be smooth or roughened or they may be provided with one or more grooves 18 and 19 (FIGS. 2 and 3) for receiving the projecting portions 32 and 33 for determining the locking position of the latch bar 31 and hence, the force holding the window frame 11 against the strip 17. Also, due to the fact that the pivot axis 34 of the latch bar 31 is displaced from the pivot axis 27 of the cams 25 and 26, the latch bar 31 exerts a locking action on the cams 25 and 26 so that the latch bar 31 will remain in the position which holds the window 1 closed even though substantial force may be applied to the window 1 urging it outwardly away from its closed position.

The window frame 11 also carries a sealing strip 35 which, when the window is closed, bears against the sill portion 37 of the structure 15.

Figures 2, 6, 8:
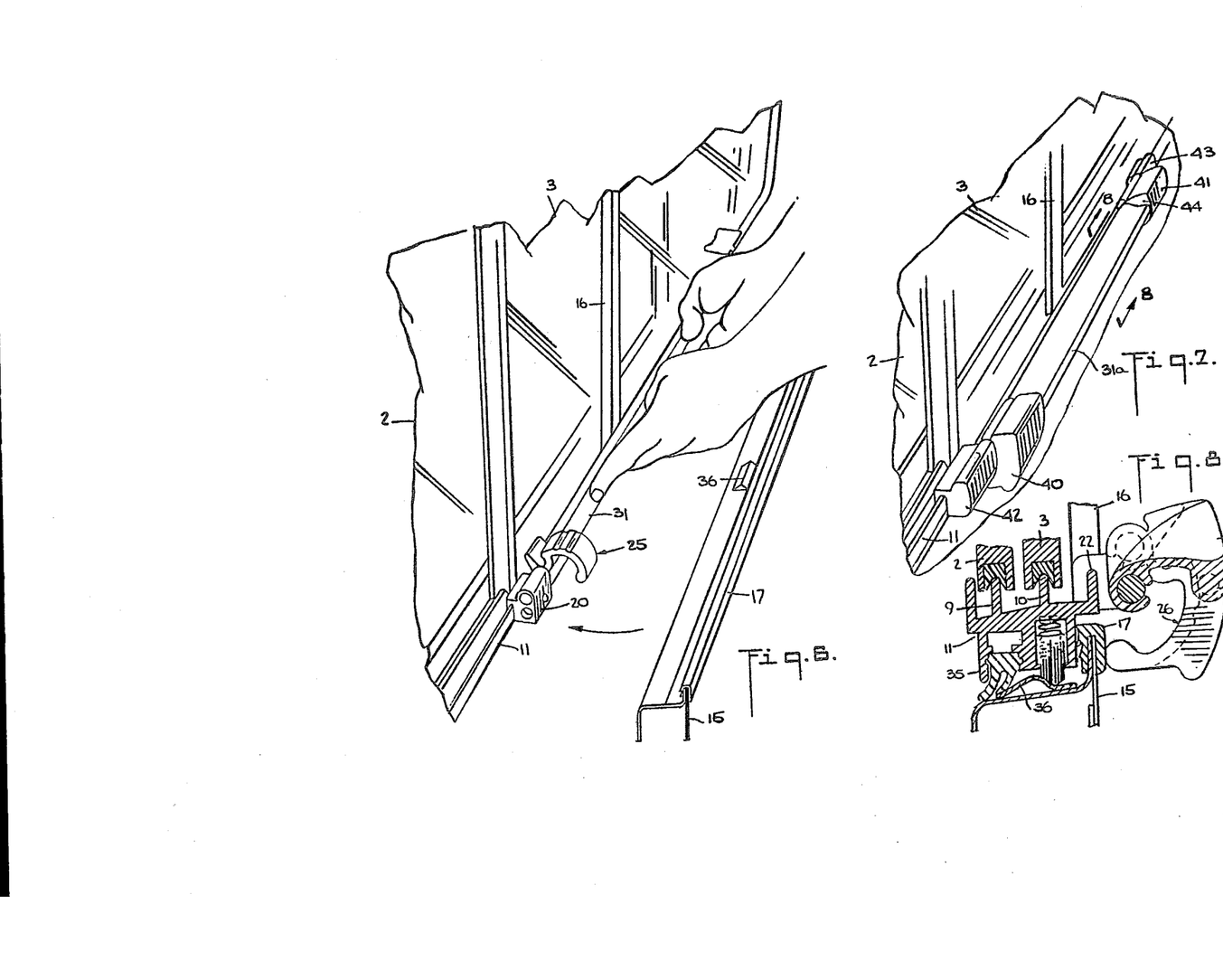
FIGS. 4, 5 and 6 are enlarged, perspective views illustrating the steps in the operation of the latch assembly illustrated in FIG. 1.
FIG. 8 is an enlarged, end view, partly in cross-section, of a portion of the structure shown in FIG. 7 and is taken along the line 8—8 indicated in FIG. 7.
Figure 4:
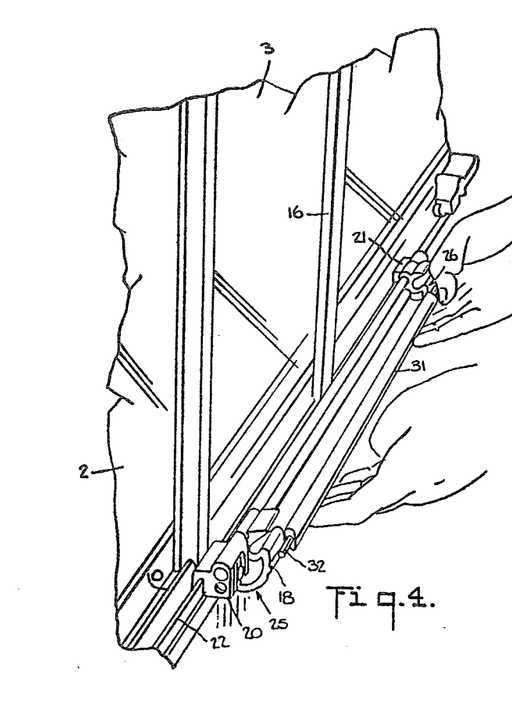
Figure 5:
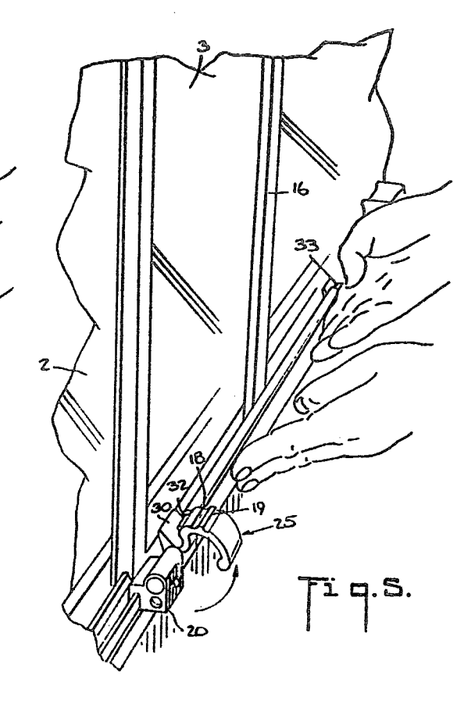

FIGs. 1–3 illustrate the relative positions of the parts when the window 1 is in its closed position and locked, whereas FIGS. 4–6 respectively show the relative positions of the parts as the window 1 is released and opened. As illustrated in FIG. 4, the latch assembly is released by lifting the latch bar 31 manually which permits the cams 25 and 26 to pivot. The latch bar 31 is then further raised, as illustrated in FIG. 5, which causes the projections 32 and 33 on the latch bar 31 to engage the projection 30 on the cams 25 and 26, and pivot the cams 25 and 26 to the positions shown in FIG. 5.

The window 1 is releasably maintained in its substantially closed position by a plurality of flexible clips, one of which is designated by the numeral 36 in FIGS. 3 and 6, the clip 36 being secured to the vehicle structure 15. Each of the flexible clips, such as the clip 36, is engageable with the bottom of the frame 11 or with a spring pressed plunger 38 mounted on the bottom of the frame 11. Accordingly, the window 1 will remain in the position shown in FIG. 5 until the bottom thereof is pushed outwardly by pressure applied to the latch bar 31 in the direction which opens the window 1. Thus, as shown in FIG. 6, such outward pressure on the latch bar 31 causes the window 1 to pivot on the hinges 12–14 and permits egress through the window opening.

When it is desired to close and lock the window 1, the steps described in connection with FIGS. 4–6 are reversed, i.e., the window 1 is pulled inwardly toward the vehicle structure 15 by grasping the cams 25 and 26 and until the bottom of the window frame 11 engages the clips 36. The inner surfaces of the portions 29 may have serrations to assist in gripping the cams 25 and 26. Thereafter, the latch bar 31 is moved downwardly until it engages the faces 28 of the cams 25 and 26 and presses the portions 29 of the cams 25 and 26 against the vehicle structure 15.

In the embodiment illustrated in FIGS. 1–6, it is preferred to employ a pair of cams 25 and 26, a pair of brackets 20 and 21 and a latch bar 31 extending from one cam 25 to the other cam 26. However, with smaller closures, only one-half of the latch assembly may be required, i.e., a single cam 25 or 26, a single bracket 20 or 21 and a short latch bar with a single projection 32 or 33 as required.

Although the embodiment illustrated in FIGS. 1–6 is entirely satisfactory from the mechanical standpoint, the cams 25 and 26 and the projections 32 and 33 on the latch bar 31 are exposed, which may possibly create problems in that various articles, such as cigarette butts, etc., may be placed in the various parts, thereby rendering the operation of the assembly difficult, and in that passengers may possibly catch their hands or clothing in the exposed parts. In addition, the latch bar 31 has an exposed concave upper surface into which passengers would tend to deposit trash. For these reasons, it may be desirable to modify the assembly shown in FIGS. 1–6 in the manner indicated in FIGS. 7 and 8. In the modified embodiment shown in FIGS. 7 and 8, the latch bar 31a has a convex upper surface and the projections 32 and 33 thereon, as well as the cams 25 and 26, are covered by covers 40 and 41 which may, for example, be made of plastic or aluminum. The brackets 20 and 21 may also be similarly provided with covers 42 and 43.

The latch bar 31a may also be provided with plates at the ends thereof, such as the plate 44, which cover the ends of the covers 40 and 41. Thus, as the latch bar 31a is rotated from the latched position shown in FIG. 7, the operation of the assembly is as described in connection with FIGS. 1–6 and the covers 40 and 41 and the plate 44, as well as the corresponding plate at the opposite end of the latch bar 31a, will rotate with the cams 25 and 26.

The embodiments illustrated in FIGS. 1–8 are preferred because they are relatively easily installed, simple in construction, highly resistant to accidental opening, operable with relatively low force and leave no projections at the edge of the window opening when the window is opened. As to the last-mentioned advantage, it will be observed that when the window is opened, as shown in FIG. 6, none of the parts of the latch assembly remain at the window opening so that it is not obstructed by parts required for operation of the latch assembly thereby avoiding hazards for an exiting passenger. Another advantage of the embodiments illustrated in FIGS. 1–8 is that no modification of the vehicle structure 15 is required for installation of the latch assembly, and the latch assembly may, if desired, be pre-assembled with the window 1 prior to the installation of the window 1. However, many of the advantages of the latch assembly of the invention can be obtained with the modified embodiments of the invention described hereinafter, even though such modified embodiments do not have all of the advantages of the embodiments described in connection with FIGS. 1–8 when used with an emergency exit window.

Figure 9:
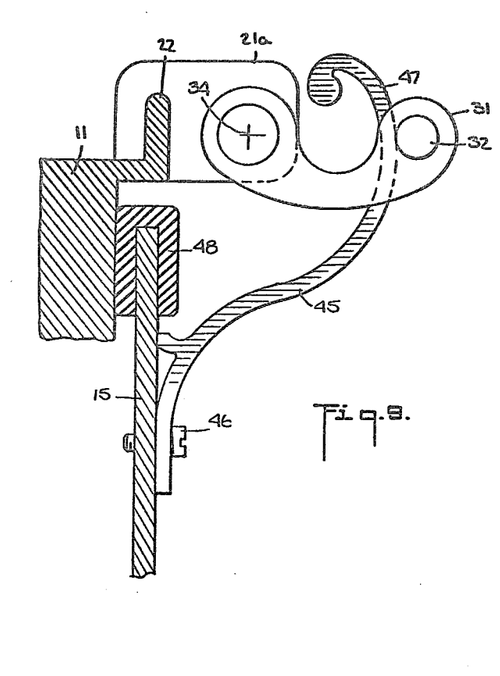
FIG. 9 is a diagrammatic, end view, partly in cross-section, of a modified embodiment of the latch assembly of the invention, in which a portion of the assembly is mounted on the fixed structure.

FIG. 9 is an end view of one modified form of the latch assembly, in which the pivotally mounted cam 25 and/or 26 is replaced by a similar cam 45 mounted in fixed relation on the vehicle structure 15. The cam 45 may be secured to the structure 15 in any conventional manner, such as by means of one or more screws 46. The latch bar 31 is pivotally mounted on a bracket 21a which is secured to the projection 22 of the window frame 11. Thus, as the latch bar 31 is rotated clockwise around its pivot axis 34, as viewed in FIG. 9, the projection 32 thereon engages the cam face 47 of the cam 45 and presses the frame 11 against the seal 48, which may, for example, be a strip of rubber mounted on the structure 15.

Figure 10:
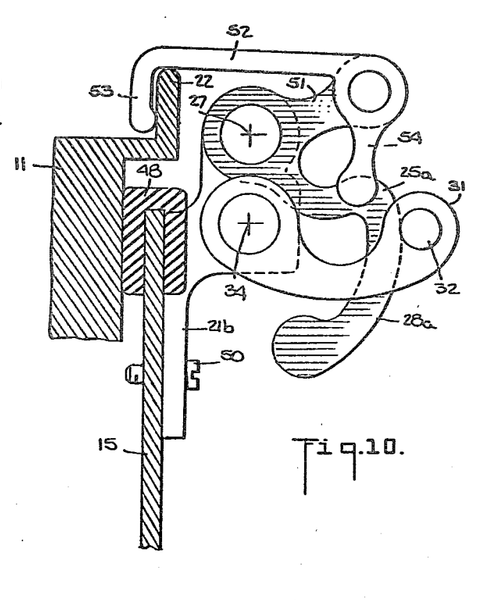
FIG. 10 is a diagrammatic, end view, partly in cross-section, of a modified embodiment of the latch assembly of the invention, in which the parts of the assembly are mounted on the fixed structure.

FIG. 10 is an end view similar to FIG. 9, of a modified embodiment of the latch assembly of the invention, in which both the latch bar 31 and a cam 25a are pivotally mounted on a bracket 21b secured to the vehicle structure 15 in any conventional manner, such as by means of screws 50. The cam 25a differs from the cam 25 previously described in that it has a connecting link 52 pivotally mounted on an extension 51 thereof. The connecting link 52 has a portion 53 which engages the projection 22 on the frame 11 and has a portion 54 which is engageable by the projection 32 on the latch bar 31, when the latch bar 31 is moved upwardly, for rotating the link 52 and disengaging the portion 53 from the projection 22. The extension 51 corresponds to the portion 30 of the cam 25, and the cam face 28a corresponds to the cam face 28 on the cam 25. Otherwise, the operation of the embodiment shown in FIG. 10 is essentially the same as the operation of the embodiments illustrated in FIGS. 1–8, and when the latch bar 31 is in the position shown in FIG. 10, the frame 11 of the closure 1 is pressed against the seal 48 on the structure 15. It will be observed, however, that the cam 25a does not engage the structure 15.

Figure 11:
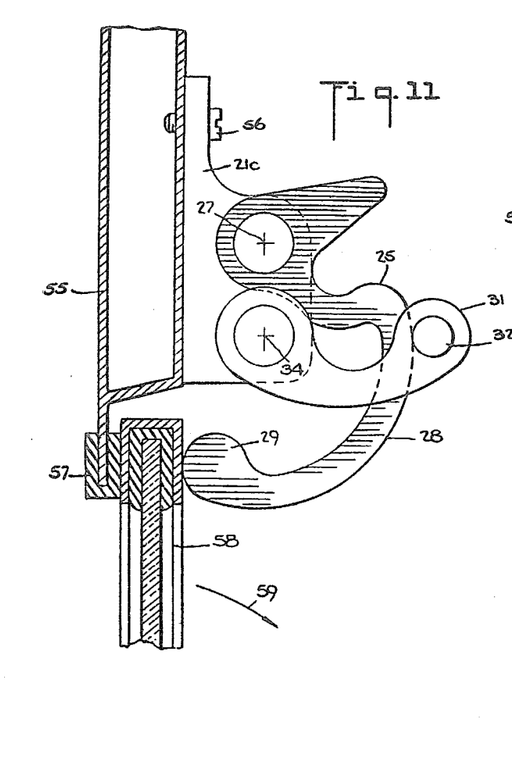
FIGS. 11 and 12 are diagrammatic, end views, partly in cross-section, of modified embodiments of the invention, in which the closure is pushed, rather than pulled, against the fixed structure.

In the embodiments previously described, the latch assembly of the invention pulls the movable closure 1 against the fixed structure 15, but the latch assembly of the invention may also be employed to push a closure against a fixed structure. FIG. 11 illustrates an embodiment of the invention which is similar to the embodiments illustrated in FIGS. 1–8, except that the latch bar 31 and the cam 25 are pivotally mounted on a bracket 21c secured to the fixed structure 55 in any conventional manner, such as by means of screws 56. The opening in the fixed structure 55 is surrounded by a sealing strip 57 and the opening is closable by a closure 58 which opens in a direction indicated by the arrow 59. The closure 58 may be pressed against the seal 57 by moving the latch bar 31 downwardly, as viewed in FIG. 11, causing the projection 32 thereon to engage the cam face 28 of the cam 25 and causing the portion 29 of the cam 25 to bear against the closure 58 and press the latter against the seal 57. In other respects, the operation of the embodiment shown in FIG. 11 is similar to the operation of the embodiments illustrated in FIGS. 1–8.

Figure 12:
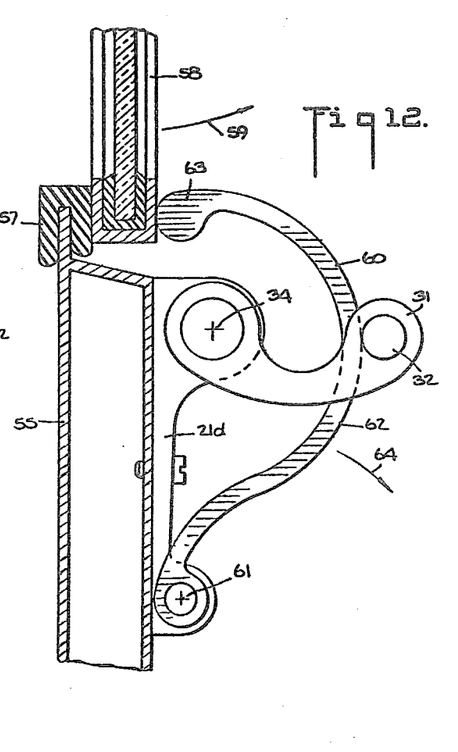

The embodiment illustrated in FIG. 12 is similar to the embodiment illustrated in FIG. 11, except for the shape and mounting of the cam 60. In the embodiment of FIG. 12, the cam 60 is pivotally mounted on a bracket 21d so as to pivot around the axis 61 and has a cam face 62 and a closure engaging portion 63. The latch bar 31 is also pivotally mounted on the bracket 21d so as to pivot about the axis 34, and FIG. 12 illustrates the parts of the assembly in the position in which the closure 58 is pressed against the sealing strip 57 mounted on the fixed structure 55. The closure 58 may be released by moving the latch bar 31 upwardly as viewed in FIG. 12, thereby disengaging the projection 32 on the latch bar 31 from the cam face 62, and preferably the distance between the axis 34 and the projection 32 is such that the projection 32 will clear the end portion 63 of the cam 60 and thereby permit the cam 60 to move downwardly in the direction indicated by the arrow 64, and thereby leave the opening surrounded by the sealing strip 57 unobstructed when the closure 58 is moved in the direction of the arrow 59.

Figures 13, 14:
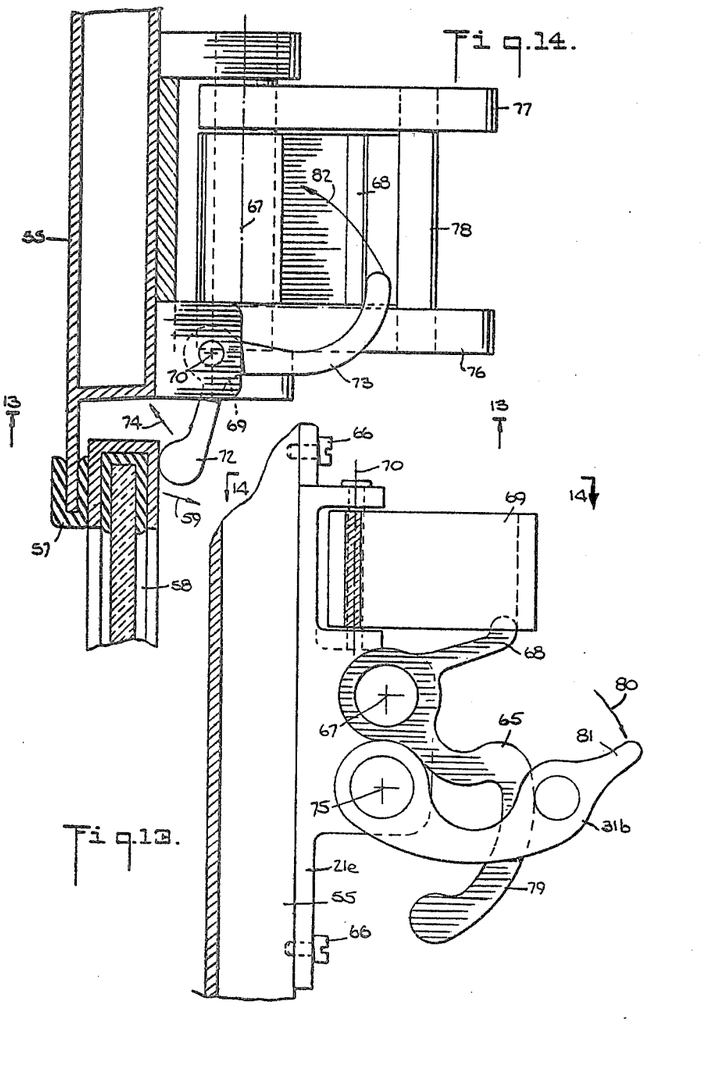
FIGS. 13 and 14 are, respectively, end and plan views of a modified embodiment of the latch assembly of the invention, in which the closure is pushed against the fixed structure.

FIGS. 13 and 14 illustrate a further embodiment of the latch assembly of the invention, in which the closure 58 is pushed against the sealing strip 57 mounted on the fixed structure 55. In the embodiment illustrated in FIGS. 13 and 14, a cam 65, similar to the cam 25, is pivotally mounted on a bracket 21e which may be secured to the fixed structure 55 in any conventional manner, such as by means of screws 66, and is pivotable about the axis 67. The cam 65 has an extension 68 which is engageable with a link or lever 69 pivotally mounted on the bracket 21e so as to pivot around the axis 70.

The link 69 has a pair of arms 72 and 73, the arm 72 of which bears against the closure 58. The extension 68 on the cam 65 bears against the arm 73 and when the cam 65 is rotated in the clockwise direction around the axis 67, as viewed in FIG. 13, the extension 68, bearing against the arm 73, causes the link 69 to rotate in the direction of the arrow 74, and causes the arm 72 to press the closure 58 against the seal 57.

The cam 65 may be caused to rotate about the axis 67 as described hereinbefore by means of the latch bar 31b which is pivotally mounted on the bracket 21e so as to pivot around the axis 75. The latch bar 31b has a pair of arms 76 and 77 which are interconnected by a rod 78 which bears against the cam face 79 of the cam 65 and, therefore, as the latch bar 31b is moved in the direction of the arrow 80, the rod 78 bears against the cam face 79 rotating the cam 65 clockwise around the axis 67.

When it is desired to release the closure 58, the latch bar 31b is moved upwardly, as viewed in FIG. 13, in the direction opposite to the direction in which the arrow 80 points; which disengages the rod 78 from the cam face 79 and permits the cam 65 to rotate in a counter-clockwise direction around the axis 67. As the upward movement of the latch bar 31b is continued, the rod 78 engages the extension 68 and rotates the cam 65. The latch bar 31b has an extension 81 which is engageable with the arm 73 of the link 69 when the latch bar 31b is moved upwardly, and when the extension 81 engages the arm 73, it rotates the link 69 in the direction of the arrow 82 and moves the arm 72 out of the path of movement of the closure 58.

With the embodiments illustrated in FIGS. 9–14, as with the previously described embodiments, it is possible to use only a single cam, acted upon by a latch bar, and a plurality of such single cams spaced along the periphery of a closure may be employed. Also, a plurality of cams may be acted upon by a single latch bar in the manner described in connected with FIGS. 1–8.

Although preferred embodiments of the present invention have been illustrated and described, it will be understood by those skilled in the art that various modifications may be made without departing from the principles of the invention.

What is claimed is:

1. In combination with a closure which is mounted on a structure defining an opening and which moves toward and transversely to a plane in which said opening lies for moving a portion of said closure in a direction toward said plane and into engagement with a portion of said structure, a latch assembly comprising a latch bar member, means pivotally mounting said member on one of said closure and said structure, said means providing a pivot axis for said member spaced from said one of said closure and said structure and lying in a plane substantially parallel to said first-mentioned plane and extending transversely to said direction, said member having a portion spaced from said axis, cam means having a cam axis and a cam face which extends at least partly around said cam axis, and means pivotally mounting said cam means on said one of said closure and said structure with said cam face facing away and spaced from said pivot axis, with said cam substantially parallel to said pivot axis and with said cam face intermediate said portion of said member and said pivot axis for engagement with said portion, said cam face increasing in spacing from said pivot axis from an amount less than the spacing between said portion and said pivot axis to an amount greater than said last-mentioned spacing, said cam means including means engageable with the other of said closure and said structure and movable in a direction for urging said closure in said first-mentioned direction and into engagement with said structure whereby pivotal movement of said member causes said portion thereof to engage said cam face and press said closure in said first-mentioned direction against said structure.

2. The combination as set forth in claim 1, wherein said means mounting said member comprises a bracket and means securing said bracket to said closure adjacent an edge thereof in fixed relation thereto.

3. The combination as set forth in claim 2, wherein said cam means comprises a cam having said cam face, said means mounting said cam means comprises means pivotally mounting said cam on said bracket and providing a further axis spaced from said pivot axis for pivotal movement of said cam, said last-mentioned means also mounting said cam with said cam face spaced from said further axis, and wherein said cam comprises a portion spaced from said further axis which is engageable with said structure.

4. The combination as set forth in claim 3, wherein said cam comprises a further portion extending radially outwardly from said further axis and disposed farther from said pivot axis than said portion of said member for engagement with said last-mentioned portion upon pivotal movement thereof in a direction opposite to the direction of movement thereof for engagement with said cam face, whereby said cam is pivotable by said latch member upon engagement of said portion of said latch member with said further portion of said cam.

5. The combination as set forth in claim 1, wherein said means mounting said member comprises a bracket and means securing said bracket to said structure in fixed relation thereto, wherein said cam means comprises a cam having said cam face, wherein said means mounting said cam means comprises means for pivotally mounting said cam on said bracket and providing a further axis spaced from said predetermined axis, said last-mentioned means also mounting said cam with said cam face spaced from said further axis and wherein said cam means also comprises means operable by said cam for engaging said closure.

6. The combination as set forth in claim 5, wherein said means operable by said cam comprises a link, means pivotally mounting said link on said cam at a point thereon spaced from said further axis and providing a link pivot axis, said link having an end spaced from the pivot axis of said link which is engageable with said closure.

7. The combination as set forth in claim 6, wherein said link has an end portion disposed on the side of said link pivot axis opposite from said end engageable with said closure, said end portion being disposed in the path of movement of said portion of said latch member whereby said last-mentioned portion is engageable with said end portion of said link for pivoting the latter.

8. The combination as set forth in claim 5, wherein said means operable by said cam for engaging said closure comprises an end portion of said cam.

9. The combination as set forth in claim 5, wherein said means operable by said cam for engaging said closure comprises a link pivotally mounted intermediate its ends on said bracket with one end thereof engageable with said closure and with the other end thereof engageable by said cam whereby pivotal movement of said cam causes pivoting of said link and movement of said one end of said link toward said closure.

10. A latch assembly adapted to secure a closure to a structure which has an opening, said closure having a plurality of edge portions including a first edge portion secured to said structure and a second, opposite edge portion movable into engagement with, and away from, said structure around said opening with pivotal movement of said closure, said closure having a first axis around which it pivots with respect to said structure, said structure having a first side facing toward said closure and an opposite side facing away from said closure and said closure having a side facing said first side of said structure, said assembly comprising a latch bar member, a bracket for pivotally mounting said member on said closure at said side thereof and at an edge portion thereof spaced from said first edge portion and providing a second axis spaced from said closure for pivotal movement of said member, said member having a portion spaced from said second axis, and a cam pivotally mounted on said bracket, said bracket providing a third axis substantially parallel to and spaced from said second axis for pivotal movement of said cam, said cam having a cam axis and a cam face which faces away from said second axis and which is intermediate said portion of said member and said second axis, said cam being mounted with said cam axis substantially parallel to said second axis and said cam face extending at least partly around said cam axis and increasing in spacing from said second axis from an amount less than the spacing between said portion of said member and said second axis to an amount greater than said last-mentioned spacing, said cam having means spaced from said third axis by an amount greater than the spacing between said second axis and said third axis and movable from one side of a plane containing said second axis and said third axis to the other side of said plane for engaging said opposite side of said structure and said bracket being out of the path of movement of said last-mentioned means, whereby pivotal movement of said member causes said portion thereof to engage said cam face and press said means of said cam against said structure and thereby press said closure against said structure.

11. A latch assembly as set forth in claim 10, wherein said cam face has a groove therein for receiving said portion of said latch member and resisting pivotal movement of the latter when said last-mentioned portion is in said groove.

12. A latch assembly as set forth in claim 10, wherein said cam has a portion extending radially outwardly from said third axis and disposed farther away from said second axis than said portion of said member for engagement with said last-mentioned portion upon pivotal movement of said member in a direction opposite to the direction of movement thereof to cause said portion of said member to engage said cam face, whereby said cam is pivotable by said latch member upon engagement of said portion thereof with said portion of said cam to release said closure.

13. In combination with a closure which is mounted on a structure defining an opening and which moves toward and transversely to a plane in which said opening lies for moving a portion of said closure in a direction toward said plane and into engagement with a portion of said structure, a latch assembly comprising a latch bar member, means pivotally mounting said member on one of said closure and said structure, said means providing a pivot axis for said member spaced from said one of said closure and said structure and lying in a plane substantially parallel to said first-mentioned plane and extending transversely to said direction, said member having a portion spaced from said axis, cam means having a cam axis and a cam face which extends at least partly around said cam axis, and means mounting said cam means on the other of said closure and said structure with said cam face facing away and spaced from said pivot axis, with said cam axis substantially parallel to said pivot axis and with said cam face intermediate said portion of said member and said pivot axis for engagement with said portion, said cam face increasing in spacing from said pivot axis from an amount less than the spacing between said portion and said pivot axis to an amount greater than said last-mentioned spacing, said portion of said latch bar engaging said cam face with pivotal movement of said member and urging said closure in said first-mentioned direction and into engagement with said structure whereby pivotal movement of said member presses said closure in said first-mentioned direction against said structure.

14. The combination as set forth in claim 13, wherein said cam means comprises a cam having said cam face and said means mounting said cam means comprises means for securing said cam on, and in fixed relation to, said structure.

* * * * *

UNITED STATES PATENT AND TRADEMARK OFFICE
CERTIFICATE OF CORRECTION

PATENT NO. : 4,186,953
DATED : February 5, 1980
INVENTOR(S) : DANIEL P. O'CONNOR It is certified that error appears in the above-identified patent and that said Letters Patent are hereby corrected as shown below:

Column 1, line 30, correct the spelling of "cause"; line 61, change "of" to --to--.

Column 3, line 21, change "radically" to --radially--.

Column 7, line 57, after "cam" insert --axis--.

Signed and Sealed this

Nineteenth Day of August 1980

[SEAL]

Attest:

SIDNEY A. DIAMOND

Attesting Officer

Commissioner of Patents and Trademark